No Printed Specification Available
X8 247
I. Fisher, Jr.
Coating Paper.
Patented Jun. 14, 1834.
BEST AVAILABLE COPY
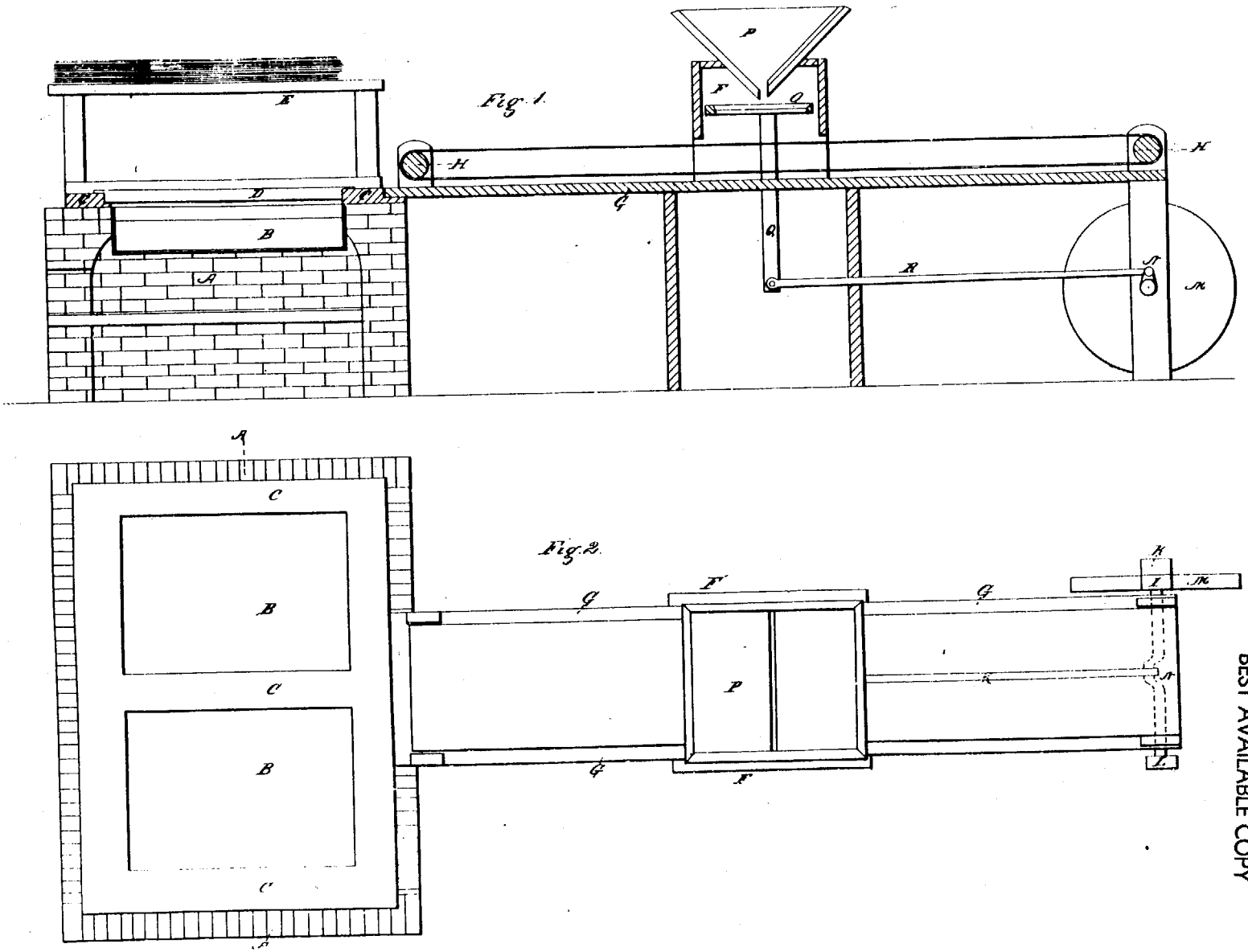
N. PETERS PHOTO-LITHOGRAPHER, WASHINGTON, D. C.

Isaac Fisher Junr of Springfield Vermont

Letters Patent.

The Schedule referred to in these Letters Patent and making part of the same containing a description in the words of the said Isaac Fisher Jr himself of his improvement in making Glass or Sand Paper.

To all to whom these presents shall come; Be it known that I Isaac Fisher Junr of Springfield in the County of Windsor and State of Vermont, have invented a new and useful improvement in making Glass or Sand Paper so called. and that the following is a full and exact description of the manner of using the same. as invented by me. Two copper kettles are to be set in arches, of Brick. in which water may be kept at any desirable temperature. around each of these kettles is placed a square curb upon said arch; which may be made of wood about 25 inches long. 22 inches wide by 5½ inches high; on a platform around these curbs may be raised a ledge at the outer edge for the purpose of retaining any superfluous size. to the tops of said curbs are to be fitted flat wood covers; which may be called size boards. between these curbs is raised a stand on which to place the paper intended to be used; In the rear of said arch is placed an upright case of wood. about four feet high 16 by 32 inches square at the bottom, and the same size upwards to the height of about 29 inches. and from thence to the top 13 by 32 inches square. On the large part of the case, which answers for a support rests another platform or table about 6 feet long. and thirty inches wide extending through the case. one end of which is made fast to the platform, on the arch, while the other is supported by a post. around two rollers placed across each end of this Platform revolves an endless feeding cloth. on one end of the feeding Roller, in the rear, is attached a loose pulley and a tight pulley. which latter pulley being the one to which the power is applied) gives motion to the other end thereof, to a diminishing pulley working with a belt into another diminishing pulley below it which is fixed to the end of a shaft which is secured to a frame supporting said platform. at the other end of the shaft is a fly wheel which also serves for a crank. this crank by means of a horizontal connecting rod, gives a vibrating motion to two vertical levers. in the interior of the case, on the top of which lever is placed, a sieve 24 inches long. 5 1/2 inches wide by 2 inches deep. These levers play on pins secured to the ends of the case, at the distance of about one third of their length from the top. On the top of the case immediately over the sieve, is placed a hopper to contain the pulverized glass. or stone or natural sand, intended to be used. with a slide gate, near the bottom thereof, which is raised for the purpose of letting the said pulverized — Stone. or Glass. aforesaid, into the Sieve as occasion may require, by means of a lever secured at the top, and . . is shut by means of a spring constantly bearing down upon said gate, in each side of the case against the sieve are placed glass lights.

The operation is performed as follows. On the size board which is kept warm. and moist. by the steam from the kettle beneath it. a single sheet of paper is placed to receive the size, which is made in the common way and previously prepared for the purpose which size is laid on and evenly spread upon the paper with a hand brush. preparatory to the reception of the powder or grains upon it. immediately before the sheet is placed upon the board. the latter is turned over. thus bringing the warm and moist side of it in contact with the under surface of the paper as it is laid upon it. — The heat and moisture thus applied in its combined action upon the paper produces the following effects. the paper is prevented from curling while the size is being spread upon it. the size more readily penetrates and is beside kept limpid, and in a proper state for receiving the powder or grains. As soon as the size is spread over the paper. the sheet is instantly transferred by hand. from the size board to the endless feeding cloth. The machine is then put in motion by casting the belt. from the loose to the tight pulley. and while the paper is carried 8247x June 14, 1834 along upon the feeding cloth. it receives, as it passes under the sieve, as much powder, or grains therefrom, as the glue will take. as soon as the paper has passed by the sieve. the band is cast off from the driving to the loose pulley. when the machine instantly stops and the paper is taken and laid away to dry. The size board is then wiped, the sides reversed, and the process repeated. One hand at the same time, will sand the paper, and lay it away, as fast as two hands at the kettles, will size the paper and transfer it to the feeding cloth. The machine may be made of the foregoing dimensions, or any convenient proportional size, according to the room in which it is placed, or the extent of business to be done. The said Fisher does not claim the invention of the curbs or kettles, or the manner of setting the same, nor does he claim the invention of the separate parts of the machinery annexed thereto. But he does claim the invention of warming and wetting the paper with a size board in manner above stated; and also the manner of conducting the paper along under the sieve and sifting the powder or grains therefrom on to the paper for the purpose of making glass or sand paper in the manner above set forth, whether done by animal, water or steam power.

[illegible]

Isaac Fisher Junr [illegible]

Witnesses
Henry Fisher
Emily Fisher

Drawing (1105 words)

(Granted June 14. 1830.)